United States Patent [19]

Kirrmann

[11] Patent Number: 4,905,196

[45] Date of Patent: Feb. 27, 1990

[54] METHOD AND STORAGE DEVICE FOR SAVING THE COMPUTER STATUS DURING INTERRUPT

[75] Inventor: Hubert Kirrmann, Dättwil-Baden, Switzerland

[73] Assignee: BBC Brown, Boveri & Company Ltd., Baden, Switzerland

[21] Appl. No.: 105,448

[22] Filed: Oct. 5, 1987

Related U.S. Application Data

[63] Continuation of Ser. No. 651,770, Sep. 18, 1984, abandoned.

[30] Foreign Application Priority Data

Apr. 26, 1984 [CH] Switzerland ............ 2053/84

[51] Int. Cl.[4] .............................. G11C 7/00
[52] U.S. Cl. .................... 365/200; 365/75
[58] Field of Search ............. 365/73, 74, 75, 76, 365/77, 200; 307/272 A, 289, 291

[56] References Cited

U.S. PATENT DOCUMENTS

| | | | |
|---|---|---|---|
| 3,533,082 | 10/1970 | Schnabel et al. | 364/200 |
| 3,736,566 | 5/1973 | Anderson | 364/200 |
| 3,974,480 | 8/1976 | Gernelle | 364/200 |
| 4,044,337 | 8/1977 | Hicks et al. | 364/200 |
| 4,075,693 | 2/1978 | Fox et al. | 364/200 |
| 4,164,017 | 8/1979 | Randell et al. | 364/200 |
| 4,254,477 | 3/1981 | Hsia et al. | 365/200 |
| 4,291,388 | 9/1981 | Ecker, Jr. et al. | 364/900 |
| 4,300,060 | 11/1981 | Yu | 307/272 A |
| 4,419,737 | 12/1983 | Yamaura et al. | 364/900 |
| 4,459,658 | 7/1984 | Gabbe et al. | 364/200 |
| 4,513,367 | 4/1985 | Chan et al. | 364/200 |

FOREIGN PATENT DOCUMENTS 8402409 6/1984 European Pat. Off. .
2268306 11/1975 France .

OTHER PUBLICATIONS

Lee et al., "Rollback Propagation and Performance Evaluation of FTMR[2]—A Fault-Tolerant Multiprocessor", Conference Proceedings, The 9th Annual Symposium on Computer Architecture, Apr. 26-29, 1982, Austin, Tex., IEEE Catalog No. 82, CH 1754-1, pp. 171-180.

(List continued on next page.)

Primary Examiner—James W. Moffitt
Attorney, Agent, or Firm—Burns, Doane, Swecker & Mathis

[57] ABSTRACT

In order to reduce the down time of a computer (1, 4-8) caused by a fault or interrupt in the program run, program recovery points are provided which are time-dependent or can be preset in the main program of a useful program, and when these recovery points are reached, the computer status is stored in at least one fault-tolerant archival memory (5, 6). The computer status includes the status of the variables of a useful program being executed, the register status of the processor (1) and the register status of the input/output devices of the computer. During execution of the useful program, at least a part of the current computer status is stored in a main memory (4) and copied into an archival memory (6) when a program recovery point is reached. By using a small, fast cache memory (7) between the processor (1) and the main memory (4), the write cycles in the archival memories (5, 6) may be reduced since a variable is replaced in the main memory (4) only when it is displaced from the cache memory by a variable which may have been updated several times. A further improvement is achieved by using an associative stack (8) on the bus (2, 3) as the main (4) and the two archival memories (5, 6). All modifications in the main memory (4) are simultaneously entered into the stack (8) and into an archival memory (5) without involving the processor (1). In the stack (8), address data pairs are entered in the order of occurrence, a character recording the respective state of the stack and allocating locations to new address/data pairs. At the recovery point, only updated data need to be transferred into the archival memory. The main memory (4) can be integrated into an archival memory having a read/write memory area and a fault-tolerant tributary memory area. A cascaded memory or a virtual memory of the computer can also be used for saving the computer status.

3 Claims, 2 Drawing Sheets

OTHER PUBLICATIONS

Kubiak et al., "Penelope: A Recovery Mechanism for Transient Hardware Failures and Software Errors", FTCS 12th Annual Int'l Symposium–Fault-Tolerant Computing, 22-24 Jun. 1982, Santa Monica, Calif., IEEE Catalog 82CH1760-8, pp. 127-133.

Lee et al., "A Recovery Cache for the PDP-11", IEEE Transactions on Computers, Band C-29, Jun. 6, 1980, N.Y., pp. 546-549.

Feridun et al., "A Fault-Tolerant Multiprocessor System With Rollback Recovery Capabilities", Proc. 2nd Int'l Conf. on Distributed Computing System, Apr. 1981.

METHOD AND STORAGE DEVICE FOR SAVING THE COMPUTER STATUS DURING INTERRUPT

This application is a continuation of application Ser. No. 651,770 filed Sept. 18, 1984, now abandoned.

BACKGROUND OF THE INVENTION

The invention is based on a method and a storage device for saving the computer status during an interrupt. The invention also relates to a use of the memory management unit and of the virtual memory of a computer when saving the computer status.

In principle, three types of interrupt are encountered in computers, with increasing degrees of difficulty in treatment:

The classic program interrupt which is initiated with an interrupt request by an external event and which is serviced by the processor after the current instruction has been completed. The processor hardware ensures that the program counter and the status word are the first to be saved in the main memory so that the processor, after servicing the interrupt, can restore the preinterrupt status.

The instruction interrupt which occurs when it is impossible to finish processing the current instruction, for example in a system having a virtual memory, because of an ineffective access in the physical memory or, in a system with error detection, because of a bus error.

This instruction interrupt forces the processor to jump out of the instruction and to service a program which fetches the missing storage area from the mass memory or repeats the unsuccessful bus access. This is supposed to be followed by a continuation of the interrupted instruction.

Since the processor is interrupted in the middle of an instruction, it must save sufficient information from its internal status to be able to continue the interrupted instruction after the data are made available or after correction. This requires considerably more effort than the classic program interrupt. Such a facility is provided by the MC 68010 microprocessor described in the German journal Elektronik, Volume 22, 1983, pages 75-78.

A system failure is considered to be the most difficult case of an interrupt since the processor status can no longer be saved as in the above-mentioned cases after the failure has been discovered since it is uncertain whether the processor has survived the failure intact. Neither the duration of the failure nor its effects on the computer status are known. The contents of the main memory are considered to be suspect even if all error detection codes of the memory cells are correct since there is uncertainty concerning the actions carried out by the already damaged processor. In the known microprocessors, no preventative measures are taken for a failure.

One prior art approach to handling interrupts is described in an article by Kubiak et al under the title "PENELOPE: A RECOVERY MECHANISM FOR TRANSIENT HARDWARE FAILURE AND SOFTWARE ERRORS", Proceedings of the 12th International Conference on Fault Tolerant Computing FTCS-12, 1982, pages 127-132. In this approach, a device is inserted between a processor and its main memory which enables a previous operating state of both the memory and the processor to be restored in the case of a failure. This previous state is defined by a recovery point.

This device is connected to the processor bus and traces the bus accesses by means of which the processor changes the main memory status (write cycles). before each modification of a variable in the main memory, this device, called "save stack", addresses the variable concerned, reads the previous content and saves it in a stack.

At the beginning of a program section, that is at a recovery point, the save stack is empty. If a failure should occur, it should be possible to restore the status of the computer at this recovery point before the next recovery point is reached. After a failure is detected, the processor is reinitialized and the save stack is written back into the main memory in the reverse order. This gives all variables the value they had at the last recovery point when the save stack was empty, even if this value has in the meantime been modified several times.

The Kubiak et al publication is based on an earlier paper by P. A. Lee, N. Ghani, K. Heron, "A recovery cache for the PD "11", Proceedings of FTCS 9, Madison, 1979, pages 3-8. A cache memory is used by other and earlier inventors for the same method without touching upon the principle called "Saving before updating".

The "Saving before updating" method has three decisive disadvantages:

1. Protection only exists against processor malfunctions which have no ambiguous effects on the main memory, for example marginal or false control signals resulting in a modification of the address or of the data without this information being supplied to the save stack.

2. Errors or losses of the main memory itself cannot be corrected. After the failure, it is assumed that all storage shelves not addressed for writing since the last recovery point are actually still intact.

3. The save stack can be used only once for recovery. Should a failure occur during the writing back, the previous contents of the main memory are no longer recoverable.

SUMMARY OF THE INVENTION

The present invention achieves the aim of reducing any computer down time due to a disturbance or a failure and restoring the computer status from before the failure as rapidly as possible in order to enable the program to be smoothly continued.

One advantage of the invention is that the computer can be used in safety-related and highly available technical processes, and that a cost reduction as a result of shorter down time following disturbances is achieved.

The present invention is also based on the updated variables being stored, but it is not the previous value but the new value which is stored, that is to say after "saving the updates".

In order to restore the previous status, a previous status (checkpoint) classified as reliable is used as a starting point at which, during recovery, all updates since setting up the checkpoint and up to the last valid recovery point are subsequently added. This properly restores the status of the computer at the last recovery point reached without errors, without making any assumption whatsoever concerning the status of the main memory or of the processor.

According to an advantageous embodiment of the invention, bus and memory errors can be bypassed. With a high computer processing speed, comparatively cheap, slow, fault-tolerant archival memories can be used for saving the computer status at program recovery points. Use of a cascaded memory which can be constructed as an integrated circuit is particularly advantageous.

BRIEF DESCRIPTION OF THE DRAWINGS

The preferred embodiments of the present invention will be described with reference to the accompanying drawings, wherein.

DESCRIPTION OF THE PREFERRED EMBODIMENT

Figure 1:
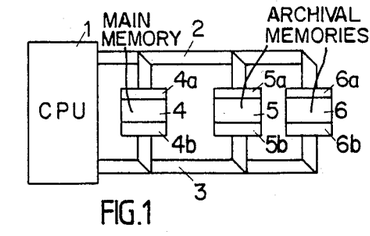
FIG. 1 shows a block diagram of a computer comprising a processor, one main and two archival memories.

Referring to FIG. 1, a processor 1, an address bus 2, a data bus 3, a main memory 4, two archival memories 5 and 6 or, respectively, a first archival memory zone 5 and a second archival memory zone 6. 4a, 5a and 6a designate address decoders in the main memory 4 and int he archival memories 5 and 6, respectively; 4b, 5b and 6b designate copying areas for the processor status in the main memory 4 and in the archival memories 5 and 6, respectively.

For normal computer operation, only the processor 1 and its main memory 4 are needed. The archival memories 5 and 6 are used for providing fault tolerance capability. In the case of the processor bus, the address bus 2 and the data bus 3 or the address and data lines have been drawn separately in order to simplify explanations. These could be just as easily a multiplexed bus or a serial bus.

The processor performs the following work: 1. useful work, 2. status saving and 3. restoration of status after failure correction.

Useful work: the useful work is the normal operation of servicing a useful program. Should a failure occur during the useful work, processor 1 carries out a recovery operation after repair as will be explained below.

The useful work is divided into steps called recovery blocks or, briefly, blocks. The blocks are considered to be indivisible operations: they are either computed through or the computer returns to the preblock status.

Recovery point: The status of the computer at any arbitrary point in time is defined by the instantaneous status of the useful program, that is to say by the status of its variables, by the status of the internal registers of the processor and of the input and output devices (not shown), briefly called I/O devices. Register status and status of the I/O devices are called processor status or context. In contrast, the program code is not part of the status. Variable status and processor status together form the computer or task status. The processor status is stored in copying area 4b of the main memory 4. In total, therefore, the main memory 4 contains the total task status.

The task status at the beginning of a block is called recovery point i (Rpi), and the status at the beginning of the next block is called recovery point i+1 (Rpi+1).

The recovery points are selected in regular time intervals or as required. The status at the recovery point is recorded by processing a status save program. The distance between adjacent recovery points depends upon the application. In fast processes the distance may not exceed some 100 ms, whereas in data processing applications it may be some hours.

If the failure occurs within a block, the processor should terminate the interrupted job and attempt, after the repair, to restore the Rpi status existing at the beginning of the block in order to reprocess the block from there. This is the task of the recovery program.

Status save and archival memory: It is assumed that the status of processor 1 and of main memory 4 are lost with a system failure. In order to be able to restore the task status after the repair, this status must be copied at every recovery point into a non-volatile, that is to say fault-tolerant archival memory. The archival memory should contain all information enabling the job, after correction of a failure, to be resumed at the point where it had been interrupted at the time of failure or shortly before.

The status save operation can be performed in parallel with the useful work or after the useful work. It is initially assumed that useful work and status save are performed successively.

At the beginning of a block, the archival memory contains the status Rpi. If a block has been completely computed without errors, the status of the process Rpi+1 is copied from the main memory 4 into the archival memory 5 and the next block can begin.

The operation of copying from the main memory into the archival memory can be performed by the processor 1 itself which addresses one cell of the main memory 4 for a read and the corresponding cell of the archival memory 5 for a write.

Instead of th processor 1, a controller, not shown, having direct memory access is capable of performing the copying work somewhat more rapidly than the processor.

The archival memory 5 should be organized in the same way as the main memory, that is to say it should have the same number of storage locations with the same structure as the main memory 4. Each storage cell in the main memory 4 is associated with a corresponding storage cell in the archival memory 5. The bus addresses of the corresponding storage cells in the main memory 4 and in the archival memory 5 do not need to match and may differ, for example in the highest-order bit to reduce circuit expenditure. However, it is preferable to have corresponding storage cells of the main memory 4 and the archival memory 5 located at addresses which are the same relative to the starting address of the memory.

In addition, it is first assumed that the archival memory 5 is approximately as fast as the main memory 4. The archival memory 5 could be, for example, a buffered CMOS read-/write-memory, a non-volatile read-/write-RAM such as the commercially available INTEL 2004, or a slower memory such as a core memory.

Other non-volatile memories such as EAROM's or EEPROM's are less suitable for this task because they are slower in the write mode by orders of up to 10,000 than the main memory. A floppy disk, optical and magnetic disks present problems not only for reasons of speed but their organization differs considerably from the linear configuration of the memory and a suitable map must first be produced.

Recovery: Following a disruption and completed repair, The recovery consists of the processor 1 being checked for reliability in self-test or external tests. The processor or the controller then loads the task status stored in the archival memory 5 by direct memory access back into the main memory 4. After that, the I/O devices and the processor 1 are loaded with their internal status (processor status). Finally, the program counter of the processor 1 is set and the useful work can begin again at the last recovery point.

Doubling the archival memory: During the copying of the recovery point into the archival memory 5, the archival memory 5 is inconsistent, containing parts from Rpi and parts from Rpi+1. The copying operation should be indivisible, that is to say it is performed either completely or not at all. Since the copying operation takes a finite time, the probability of a failure during this time is not negligible. Although the archival memory 5 will not lose any information in the case of a failure, the zone or storage area being processed or traced at the time of the failure is inconsistent and is considered lost.

For this reason, the archival memory is divided into two identical halves, the archival memory areas 5 and 6. The processor 1 has the capability of writing into both areas of the archival memory 5, 6, but not at the same time. A failure should not cause the processor 1 to modify the section of the archival memory with which it is not working at the time.

At the beginning of a block, both areas 5 and 6 of the archival memory contain the same contents, this being one copy each of the main memory 4 (process status at Rpi). Both archival memories or archival memory areas are successively updated, that is to say brought to Rpi+1. As a convention it shall be assumed that first the archival memory 5 is updated and then the archival memory 6.

The status save operation is performed as follows:
(1) The processor flags the memory 5 as invalid,
(2) It copies the contents of main memory 4 into archival memory 5,
(3) It flags the archival memory 5 as valid again.

The copies may be provided with the physical or with a logical time of day for marking their validity.

The storage area of the archival memory being processed at the time is called the "dirty" area and the other one the "clean" area.

The processor 1 first executes the status save with the archival memory 5. Then the roles of the dirty and clean areas are interchanged and the processor 1 executes the same operation with the archival memory 6.

Should a failure occur during the copying of one of the two storage areas, one of the copies is always clean, assuming that the processor 1 is not capable of modifying the area of the archival memory with which it is not working at the time, even in the case of a failure.

Figure 2:
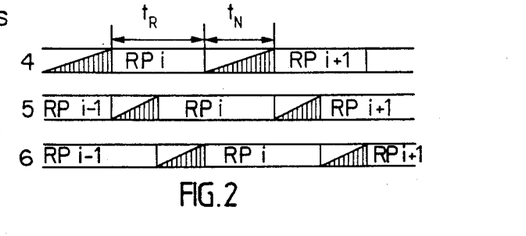
FIG. 2 shows a timing diagram for saving the computer status by two archival memories which are updated after a useful job.

The course of the operations can be seen from FIG. 2. The hatched zones signify that the zone concerned is being processed. Recovery points are called Rpi−1, Rpi and Rpi+1. $t_R$ designates the duration of save time and $t_N$ the duration of useful job time. During the updating of the archival memory 5, the contents of the archival memory 6 remain unmodified and during the updating of the archival memory 6, the contents of the archival memory 5 remain unmodified.

Recovery: Should a failure occur during the first copying operation, the processor returns to the last recovery point Rpi; if it occurs during the second copying operation, the processor 1 starts with the new recovery point Rpi+1. If both copies are valid and contain the same RP, the processor 1 takes either copy.

After completed repair, a recovery program checks which half of the archival memory contains a valid RP and, if this applies to both halves, the more recent RP is selected. The task is then resumed from this point.

Numerical example: Only an 8-bit processor is being considered here, expansion to 16-bit or 32-bit processors would be well within the capabilities of one skilled in the art.

In a typical program, the address space M is dimensioned for 64 kbytes (1 kbyte = 1024 words). Although the address space is never completely filled, all 64 kbytes, that is to say 65,536 words, must be saved in order to prevent the worst case from happening.

A conventional microprocessor executes about $10^6$ read or write operations per second. Each operation takes 1 $\mu s$. The processor or a controller having direct-memory access require two memory transfers of 1 $\mu s$ each in order to transfer one word (2 bytes) from the main memory 4 into the archival memory 5 or 6 (one read and one write operation) so that the save time $t_R$ for one word is $$t_S = 2 \ \mu s.$$

The status save thus takes $$t_R = 2 \pm 65,536 \ \mu s \approx 262 \ ms.$$

In time-critical applications, this time can be significant but in many applications it is acceptable.

Simplification of the status save operation: The status save operation described above is time consuming particularly in the case of a large memory. In order to have a rational relationship between useful work and duration of save time, the recovery blocks should be at least as long as twice the save time, which might not be tolerable in time-critical applications.

The duration of the save time can be reduced to one half by the method described in the following paragraphs. Instead of the processor 1 writing individually into both storage areas, one of the storage areas may be updated even during the useful job run. This happens by the dirty archival memory area tracing the activity on the bus and updating itself accordingly.

During normal operation, the status of the main memory 4 is updated in accordance with the progress of the program. Each change in the main memory 4 is the result of a write operation on the processor bus. The dirty section of the archival memory traces this activity on the bus, in principle without disturbing the traffic. It could also be permissible for the archival memory 5 to run the cycles a little slower in order to be able to follow. Thus, the bus should operate in such a manner (in broadcast) that several receivers on the bus are able to "listen in" at the same time.

Every time a storage cell is modified by a write operation, the dirty archival memory executes the same update in its copy of this storage cell. The clean section of the archival memory is not modified.

At the end of the block, the processor writes its status and, for example, the time of day into the main memory (and thus also into archival memory 5) and, in doing so, reports its status as being valid. The dirty archival memory now contains the status of the main memory 4 and of the processor 1 at the end of block $Rpi+1$. At this point, both storage areas of the archival memory contain a consistent status which is the one at the beginning (Rpi, clean storage area 6) and the one at the end of the block ($Rpi+1$, formerly the dirty storage area 5).

As described earlier, the roles of the clean and dirty storage areas are now interchanged and the processor 1 copies the end status $Rpi+1$ into the formerly clean storage area. The old clean storage area is thus updated to the same state as the valid new one, it also contains the clock flag and is reported to be valid. The conclusion of the status save operation defines the new recovery point, $Rpi+1$.

Figure 3:
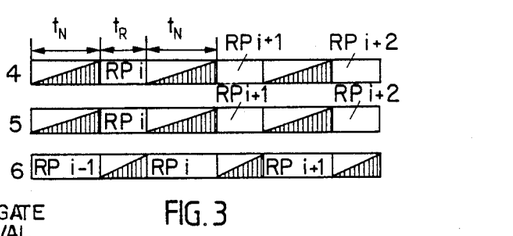
FIG. 3 shows a timing diagram for saving the computer status by two archival memories according to FIG. 1, one archival memory being updated during the useful job and the other one afterwards.

FIG. 3 shows the course of the operations.

This method also allows a slower memory to be used for the archival memory than for the main memory because the archival memory is utilized only for the write cycles. In general, it is assumed that an average of one write cycle occurs in nine read cycles.

In the method described in connection with FIG. 3, the save time is reduced by one half, in our example from 262 ms to 131 ms, and it is possible to use an archival memory which is about 9-times slower than the main memory.

In the method explained in connection with FIG. 3, two bus cycles were required for transferring the contents of one storage cell from the main memory to the archival memory 6, one read and one write operation. The transfer can be reduced to only one bus cycle if the bus permits transfer operations in which the archival memory, in monitor mode, traces the values read by the processor the transfer device having direct memory access. For the transfer operation, it is then only necessary to read all cells sequentially. This makes it possible to reduce the save time from 131 ms to 65.5 ms in the above-mentioned cases.

Figure 4:
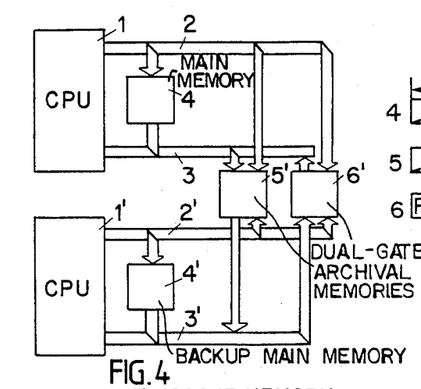
FIG. 4 shows a block diagram containing redundant processors and memories.

FIG. 4 shows a redundant arrangement of processors and memories as protection against malfunction by the processor, the bus or the main memory. In this figure, 1' designates a back-up processor and 4' a back-up main memory. 2' designates an address bus and 3' a data bus. These two buses connect the back-up processor 1' to the back-up main memory 4' and to dual-gate archival memories 5' and 6'. The two dual-gate archival memories 5' and 6' are also connected via the buses 2 and 3 to the main memory 4 and to the processor 1. This redundancy structure has the purpose of assisting the resumption of useful work after a transient fault has been overcome. The dual-gate archival memories 5' and 6' are designed such that they can be accessed for reading and writing by the one processor and for reading only by the other one. One of the processors, for example processor 1, works as the primary computer and the other processor 1' is available as a back-up. Processor 1 takes recovery points in its archival memory 5'. When the processor 1 is performing useful work, the back-up processor 1' then copies the contents of the archival memory 5' into its own archival memory 6'. Should the processor 1 fail, the back-up processor 1' comes to the rescue, loads the contents of the archival memory 5' or 6' into its back-up main memory 4' and continues the run using its back-up main memory 4' and its archival memory 6'.

After repairs have been effected, the processor 1 is then available as back-up processor.

Figure 5:
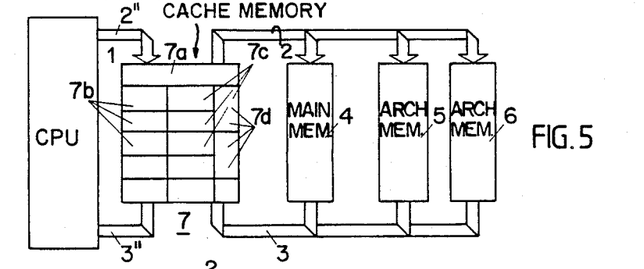
FIG. 5 shows a block diagram of a processor in which, in addition to the memories of FIG. 1, a cache memory is provided for reducing the write accesses of the archival memories.

FIG. 5 shows a cache memory 7 being used between the processor 1 and the main memory 4 and the connected archival memories 5 and 6. The cache memory 7 is connected to the processor 1 via an address but 2" and a data bus 3". 7a designates an associative address decoder in the cache memory 7, 7b is an address storage area, 7c a data storage area and 7d a flat storage area.

The most suitable operating mode for the cache memory is that called write-back, see for example W. D. Strecker, Proceedings of the 3rd Symposium on computer Architecture, January 1976, pages 155 to 158. An updated variable is replaced in the backing memory only if it has been shifted from the cache memory by another variable. Since one variable can be updated several times before it is displaced, the number of write cycles in the archival memory can thus be reduced.

However, in order to save the total computer status at the recovery point, it is necessary to write out the contents of the cache memory when an RP is reached. There are, for example, three methods to do this:

(1) The processor may address the cache memory also as a normal memory. However, this mode has the disadvantage that it is not provided in commercially available computers.

(2) The processor fills the cache memory with address/data pairs which initiate the write-back mechanism.

(3) Some computers have a so called cache-invalidate facility which causes the cache memory to become transparent.

The efficiency of this method depends on the socalled usage factor fb. The usage factor specifies how many times a variable is modified between two recovery points. If a cache memory is used, the archival memory may be slower by the factor fb than without cache memory.

The flag storage area 7d is used for flagging the data written in a combined read/write cache memory. In this case, the writing out of the contents of the cache memory may be restricted to the area which is flagged. This further reduces the save time.

Figure 6:
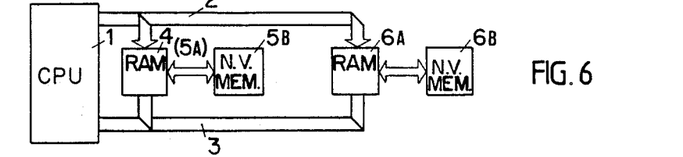
FIG. 6 shows two fault-tolerant memories being used as main and archival memory.

FIG. 6 shows two non-volatile memories being used as main and archival memories.

The non-volatile memory used can be, for example, a device such as the INTEL 2004, see INTEL Memory Component Handbook: 2004, A 4K (512×8) non-volatile random access memory, June 1983, order number: 230665-002, pages 3-1 to 3-5. Each memory consists of a normal randomaccess memory (RAM) 5A and 6A, each storage cell being associated with a nonvolatile shaded or tributary storage cell 5B and 6B, respectively.

If data are to be stored in the fault-tolerant area, the circuit receives a copying command (non-volatile (NV) command) from the processor 1 which causes it to copy the contents of its RAM 5A and 6A into the fault-tolerant area 5B and 6B in a single operation. The copying takes about 10 ms; it must not occur too frequently because the circuit may execute only a limited number of copying operations. Present-day nonvolatile RAM's guarantee 10,000 copying operations. For this reason, such operations are executed only in cases of trouble. They are triggered either by monitoring the supply voltage or by a fault-signal line. This makes it necessary for the power supply to last for the duration of the copying operation.

The archival memories 5 and 6, respectively, should both be designed to receive a copying command in the case of an interrupt. Thus the fault-tolerant area of the memory does not replace duplication of the archival memory. This method is based on the assumption that the contents of the memory are preserved, if necessary, at least for the duration of the copying. In this method, a special main memory 4 can be omitted. It is replaced by the RAM zone 5A or 6A of one of the archival memories. This does not render superfluous the regular copying of the data to be saved at a recovery point. The role of the archival memory is taken over by the other RAM section.

Figure 7:
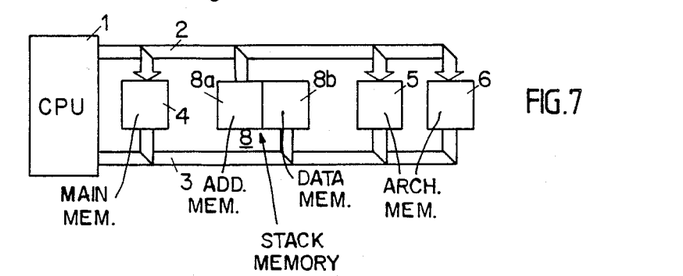
FIG. 7 shows a stack for shortening the save time.

FIG. 7 shows another typical embodiment in which a temporary memory 8 serving an address storage area 8a and a data storage area 8b is provided between the main memory 4 and the archival memories 5 and 6 and is connected to the same address bus 2 and data bus 3. The memory 8 is empty at the beginning of a block. All updates in the main memory 4 are simultaneously entered into the memory 8 and into one of the archival memories (dirty zone). For each write access to the bus, the associated address data pair is registered and entered in the memory 8 without using the processor. The memory 8 can be organized as a FIFO (first-in, first-out) or a stack (first-in, lastout) memory. All address/data pairs are entered in the order of occurrence and a counter or stack pointer records the respective occupancy level of the memory and assigns locations to the new value pairs. At the end of a block, therefore, the stack contains all the data updated since the beginning of the block.

The second archival memory 6 is updated by:
(1) Flagging it as invalid,
(2) Transferring all entries from the stack into the archival memory 6 and
(3) Flagging it as valid again.

The first archival memory 5 has already been updated, either by monitoring, as described above, or with the same method as the archival memory 6.

The stack 8 reduces the time taken for the status save since it contains all data required for the status save in ordered form. It is no longer necessary to transfer the total contents of the main memory into the archival memory 6, but only the part modified since the last recovery point.

Numerical example: If the main memory 4 must be saved at every recovery point, the duration of the save time is, without stack 8:

$$t_R = M \times ts$$

and with stack 8:

$$t_R = L \times ts = (tnarb/tm) \times ts,$$

where L is the effectively filled section of the stack 8, tm the mean time between two write cycles and tnarb the mean useful job time between two recovery points. Compared with saving the main memory 4, saving the stack becomes advantageous when $$tnarb/tm < M.$$

If $ts = 1$ μs and $M = 65,536$, the save time without stack 8 is $t_R = 65.5$ ms. If $tm = 10$ μs, a save with the stack 8 becomes advantageous if $tnarb < 655$ ms.

It is desirable for the efficiency eff, that is to say the ratio between useful job time and save time, to be much greater than 1. If the main memory 4 is saved, the save time is fixed. The efficiency is then $$eff = tnarb/t_R = tnarb/(M \times ts).$$

If a stack 8 is used, the efficiency is a constant:

$$eff = ts/tm.$$

Figure 8:
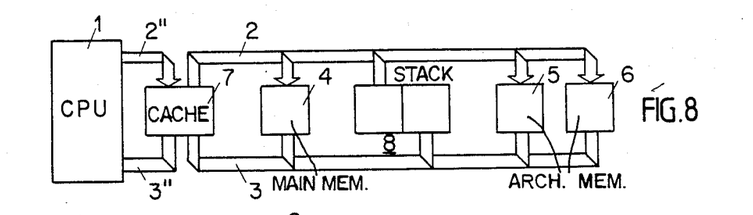
FIG. 8 shows a cache memory being used for relieving the stack of FIG. 7.

The stack capacity may be considerably reduced by inserting a cache memory 7 between the processor 1 and the stack 8 as is the case in many computers, see for example the above-mentioned strecker publication. FIG. 8 shows a typical embodiment containing such a cache memory 7. The first archival memory 5 may be updated for example by monitoring. The stack 8 acts as a backing memory. It is organized, for example, as a FIFO or a STACK memory. The most suitable operating mode for the cache memory is again the one called write-back. In order to save the total computer status at the recovery point, however, it is necessary to write out the contents of the cache memory. Several methods for doing this have already been described. The efficiency of this method depends on the application and is most effective when the addresses of the variables are arranged in groups, as in most modern programming languages.

Figure 9:
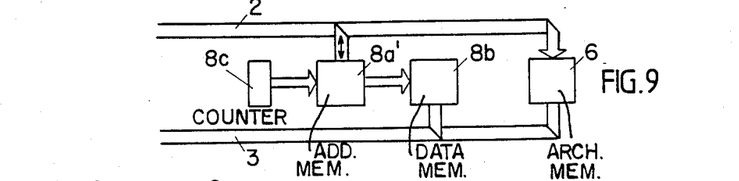
FIG. 9 shows a stack according to FIGS. 7 and 8 configured as an associative memory.

The save time can be shortened by organizing the stack in a different way, as will be shown with the aid of FIG. 9.

Until now, the stack 8 has been organized as a linear memory (FIFO or STACK). In this arrangement, the same address may occur several times because a variable, for example a run variable in a loop, has been updated several times. The number of entries in the stack 8 could be reduced if only the last value of the variable were stored. This would make it possible to use an archival memory which is much slower than the stack.

In order to achieve this, the stack 8 is provided with an associative memory which has an associative address storage area 8a', an associative data storage area 8b and a counter 8c.

With each write cycle on the processor bus, the stack reads the address. It compares it with the entries in its address table by applying the address to the key input of the associative memory. If the address is not found, it is read into the associative memory as a new entry. It is allocated its position by the counter 8c which is then incremented by one position. From now on, the address is considered to exist. If the address already exists or has just been entered, the position of this address appears at the position output to data storage area 8b. The position address has the same length as the counter 8c. Following this, the associated data is stored in the data storage area 8b. The data memory may be a normal semiconductor memory.

When writing the contents of the stack 8 into the archival memory 6, the processor 1 addresses the counter 8c and thus forces a position address on the position lines and on the address lines. In this mode, the processor 1 is not driving the address lines but allows them to float. The processor 1 is buffered for example by tri-state gate for this purpose.

All positions of the counter are addressed. The corresponding address/data pairs are output to the address and data lines and loaded into the archival memory 6. The counter 8c is decremented each time until the stack 8 is empty. This concludes the save of the recovery point.

The efficiency of this method is application-related and is:

$$eff = tm/(ts \times fb).$$

A virtual memory, existing in some computers, see for example the journal COMPUTER, March 1982, pages 35 to 41, can be used in the same manner as the cache memory for the status save. In the virtual memory, the entries are not individual words but whole pages of, for example, 1 kbyte. The write-back algorithm has been successful as a popular operating mode. A page is copied back only if it has been shifted from the main memory and modified. The main memory is subdivided into pages of, for example, 1 kbyte. When a recovery point is reached, all pages updated since the last recovery point are saved onto a disk memory or a disk if they are not already there. Instead of the disk memory, another type of faulttolerant memory can also be used.

The difference to the known operating mode of the virtual memory as quoted above consists in that, in addition to the page status, the processor status is also saved at every recovery point. This makes it possible to use the normal virtual memory for a status save.

Figure 10:
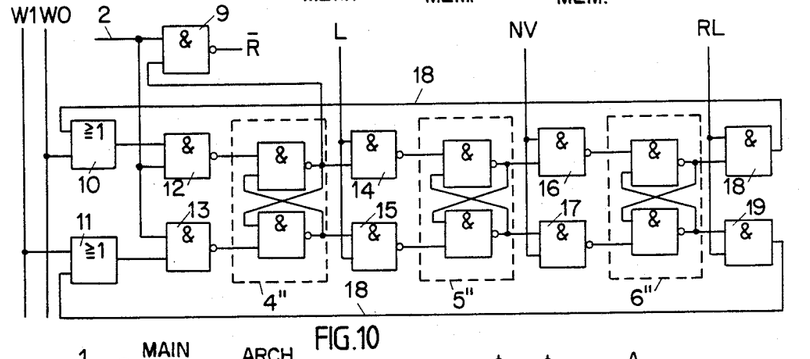
FIG. 10 shows one storage unit of a tandem memory.

FIG. 10 shows a tandem memory which can be constructed as an integrated circuit and makes it possible to shorten the save time by means of a new memory structure. 4" designates a main memory cell which consists of a fast flip flop. 5" is a cascaded storage cell also consisting of fast flip flops, 6" is an archival storage cell which consists of a fault-tolerant storage element such as is the case, for example, with the backing memory of the INTEL 2004. The main memory cell 4" can be controlled by switching elements 12, 13 consisting of NAND gates. The switching elements provided for controlling the cascaded and archival storage cells 5" and 6" are NAND gates 14 and 15 and 16 and 17, respectively, which can be controlled via a load line L or a copy command signal line NV. The NAND gates 12 and 13 can be controlled by the address signal line or the address bus 2. The signal line 2 is also connected to the input of a NAND gate 9, the second input of which is connected to an output of the main memory cell 4". At the output of the NAND gate 9, a read signal $\overline{R}$ is available. The archival memory cell 6" is connected via NAND gates 18 and 19, which are controllable by a load-back line RL, to the input of OR gates 10, 11. A second input of the OR gate 10 is connected to a write signal line W0 and its output is connected to a second input of the NAND gate 12. A second input of the OR gate 11 is connected to a write signal line W1, the signal of which is complementary to the signal on line W0. The output of this OR gate 11 is connected to a second input of the NAND gate 13.

In this cascaded memory, copying from the main memory 4" into the archival memory 5" takes place in an indivisible operation, without intervention by the processor or by a controller having direct memory access. The cascaded memory cell 5" represents a shaded cell for the main memory cell. In order to maintain the computer status even in the event of a power failure, the cascaded memory cell 5" is also supplemented by a fault-tolerant archival memory cell 6".

Figure 11:
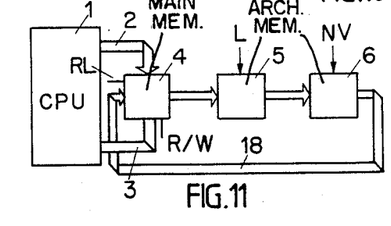
FIG. 11 shows a fault-tolerant computer containing a tandem memory according to FIG. 10.

The total configuration of the computer may be seen in FIG. 11. R/W is a read/write signal line and 18 an internal data path in accordance with FIG. 10. This data path 18 is not accessible from outside and has the same bit capacity as the memory itself.

In the normal case, jobs are executed with the main memory cell 4" of the memory. The totality of the main memory cells act in exactly the same manner as the main memory in FIG. 1. A cell is addressed by the address line 2. It can be loaded via the complementary write signal lines W0 and W1; in the rest state, W0 and W1 are at zero. The cell contents may be read out via the read line $\overline{R}$.

At every recovery point, the contents of the main memory cell 4" are copied into the cascaded memory cell 5" by activating the load line L. The copying takes less than 1 μs since the cascaded memory cell 5" is also constructed of fast RAM components. The probability of a failure during the copying period may be considered to be very low; it is about 15 ns. The important factor in this is that all main memory cells are simultaneously copied into the cascaded archival memory cells, that is to say the L line is common to all storage cells.

In the event of a power failure or other fault, the contents of the cascaded memory cell 5" are copied in one operation into the archival memory cell 6" by activating the NV line. This operation takes about 10,000-times al song as the copying from main memory into the cascaded memory 5" since the archival memory cells 6" are constructed of fault-tolerant storage elements like those of the INTEL 2004.

Buffering of the power supply is intended to maintain the voltage for the duration of the copying operation, even in the event of a short circuit in the power supply. A diode, not shown, may be used for isolation.

When the supply voltage has returned and the processor is again classified as reliable, the contents of the archival memory cell 6" are copied in one operation back into the main memory 4" by activating the RL line. From this moment on, the main memory 4" again contains the status at the last recovery point and the processor can resume the run.

The cascaded memory cell 5" cannot be omitted since the status of the main memory cell 4" is not consistent at any arbitrary time. A processor 1 cannot be expected to reliably store its internal status at the time of a fault. This is why the contents of the main memory are loaded at regular intervals, for instance at every recovery point, into the cascaded memory 5.

Figure 12:
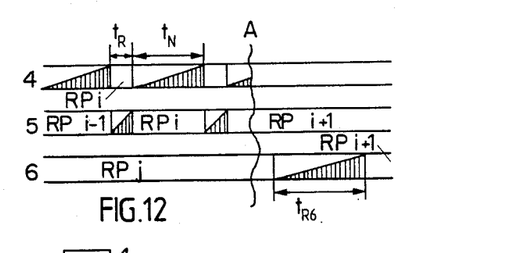
FIG. 12 shows a timing diagram for saving the computer status by using a double-buffered fault-tolerant memory.

FIG. 12 shows the progress of the status save with time, using a double-buffered fault-tolerant memory. A designates the failure or interrupt and $t_R$ is the save time in the cascaded memory cell 6".

Figure 13:
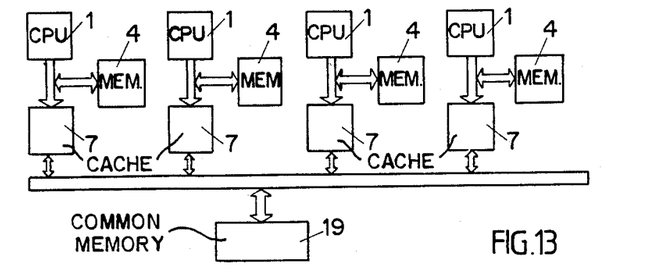
FIG. 13 shows a common memory being used for several computers.

FIG. 13 shows several processors 1 being used with local main memories 4 and the local cache memories 7 with a common memory 19. A task started by one processor may be continued by another processor. This presupposes that the status of the task is stored in the common memory. Only the code of a task may be assigned to a local processor. This results in frequent accesses to the common memory, limiting the performance of the multi-processor system.

In order to reduce the number of accesses to the common memory, the initial status of the task is stored in the common memory. It is loaded into the local processor executing the task. The current processor status is in each case stored in the local cache memory 7. In the event of an interrupt occurring, the contents of the cache memory 7 are transferred to the common memory 19 where they can be called up for further processing. Essentially, only the final status of the tasks need to be transferred on the bus common to the processors 1. This greatly relieves this bus.

What is claimed is:

1. An apparatus for saving the task status of a computer to facilitate recovery in the event of a hardware failure occurring during execution of an executable program, said program having variables and being provided with a plurality of recovery points, each pair of such recovery points delimiting a program block, said computer including a main memory, a processor having at least one internal register, and an input/output device having an internal register, said main memory, said processor and said input/output device communicating with each other via an address bus and a data bus, and said main memory containing the current task status of the computer including the status of said variables and said registers during the program run, comprising;
   a cascaded memory having a plurality of storage units, each storage unit including a main memory cell forming a part of said main memory and being controlled by at least one first switching element, a second memory cell having an input connected to an output of said main memory cell via at least a second switching element, said second switching element operative to load said second memory cell with the contents of said main memory at said program recovery points, a non-volatile archival memory cell having an input connected to an output of said second memory cell via at least a third switching element and an output connected to an input of said first switching element via at least a fourth switching element, said third switching element operative to load said non-volatile memory cell with the contents of said second memory cell upon occurrence of a failure.

2. The apparatus of claim 1, wherein said main memory cell, said second memory cell and said archival memory cell each comprises bistable storage elements, and said first, second, third, and fourth switching elements each comprises first and second NAND gates, the output of the fist NAND gate of said fourth switching element being connected to one input of a first OR gate, the output of the second NAND gate of said fourth switching element being connected to one input of a second OR gate, the outputs of said first and second OR gates being connected to an input of the first and second NAND gates of said first switching element, respectively, said first OR gate having another input connected to a first write signal line and said second OR gate having another input connected to a second write signal line, said second write signal line carrying a signal which is the complement of the signal on said first write signal line, said first and second NAND gates of said first switching elements each having another input terminal connected to said address bus, input terminals of said first and second NAND gates of said second switching elements being connected to a line which carries a first data transfer command signal, input terminals of said first and second NAND gates of said third switching element being connected to a second data transfer command signal line, and input terminals of said first and second NAND gates of said fourth switching element being connected to a third data transfer command signal line.

3. An apparatus for saving the task status of a computer to facilitate recovery in the event of a hardware failure occurring during execution of an executable program, said program having variables and being provided with a plurality of recovery points, each pair of such recovery points delimiting a program block, said computer including a main memory, a processor having at least one internal register, and an input/output device having an internal register, said main memory, said processor and said input/output device communicating with each other via an address and data bus, and said main memory containing the current task status of the computer including the status of said variables and said registers during the program run, comprising:
   a cascaded memory having a plurality of storage units, each storage unit including a main memory cell forming a part of said main memory and being controlled by at least one first switching element, a second memory cell having an input connected to an output of said main memory cell via at least a second switching element, a non-volatile archival memory cell having an input connected to an output of said second memory cell via at least a third switching element and an output connected to an input of said first switching element via at least a fourth switching element;
   said main memory cell, said second memory cell and said archival memory cell each comprising bistable storage elements, and said first, second, third and fourth switching elements each comprising first and second NAND gates, the output of the first NAND gate of said fourth switching element being connected to one input of a first OR gate, the output of the second NAND gate of said fourth switching element being connected to one input of a second OR gate, the outputs of said first and second OR gates being connected to an input of the first and second NAND gates of said first switching element, respectively, said first OR gate having another input connected to a first write signal line and said second OR gate having another input connected to a second write signal line, said second write signal line carrying a signal which is the complement of the signal on said first write signal line, said first and second NAND gates of said first switching elements each having another input terminal connected to said address bus, input terminals of said first and second NAND gates of said second switching elements being connected to a line which carries a first data transfer command signal, input terminals of said first and second NAND gates of said third switching element being connected to a second data transfer command signal line, and input terminals of said first and second NAND gates of said fourth switching element being connected to a third data transfer command signal line.

* * * * *